United States Patent [19]
Bryant et al.

[11] 3,872,548
[45] Mar. 25, 1975

[54] SEALANT
[75] Inventors: Earl Ruskin Bryant, Orchard Lake; Russell Leo Sears, St. Clair Shores; Martin Samuel Katz, Livonia, all of Mich.
[73] Assignee: Inmont Corporation, New York, N.Y.
[22] Filed: July 5, 1973
[21] Appl. No.: 376,656

Related U.S. Application Data
[62] Division of Ser. No. 217,698, Dec. 3, 1971, abandoned.

[52] U.S. Cl............ 24/73 HS, 24/73 FT, 52/758 J, 260/42.47, 260/88.2 C, 260/880 B
[51] Int. Cl... A44b 21/00, C08c 11/04, C08f 19/08
[58] Field of Search........ 260/88.2 C, 880 B, 42.47; 52/758 C, 758 J; 24/73 FT, 73 HS

[56] References Cited
UNITED STATES PATENTS

| | | | |
|---|---|---|---|
| 2,981,991 | 5/1961 | Scott | 24/73 HS |
| 3,000,868 | 9/1961 | Powers | 260/88.2 C |
| 3,130,822 | 4/1964 | Meyer | 24/73 HS |
| 3,132,727 | 5/1964 | Meulenberg et al. | 24/73 HS |
| 3,325,430 | 6/1967 | Grasley | 260/880 B |
| 3,630,981 | 12/1971 | Finfinger et al. | 260/88.2 C |
| 3,640,981 | 2/1972 | Davis | 260/88.2 C |

OTHER PUBLICATIONS
Architectural Record–Joints for Curtain Walls, (Feb. 1958), pages 225–228, 239, 296 & 300.
Pennsylvania Ind. Chem. Corp.–Piccotex bulletin PPN-034-A.

Primary Examiner—Melvyn I. Marquis
Assistant Examiner—H. H. Fletcher
Attorney, Agent, or Firm—Philip R. Arvidson

[57] ABSTRACT
A sealant particularly adapted for use on automobile bodies to seal joints. A typical composition of the sealant is:

| | | |
|---|---|---|
| Kraton 4113 | 42.1% by weight | Blocked SBR |
| Piccotex 100 | 13.5% | Vinyl Toluene-Alpha Methyl Styrene Copolymer |
| Camelwite Whiting | 42.1% | Calcium Carbonate |
| Regal 660R | 1.7% | Furnace Black |
| Plastanox 2246 | 0.4% | Antioxidant |
| Plastanox LTDP | 0.2% | Antioxidant |
| | 100.0% | |

The process of sealing automobile body joints, drain holes and other similar areas using the above sealant.

A sealant clip comprising a clip-on holder adapted to clip over a joint and integral therewith strip of sealant adapted to seal the joint upon heating. The holder holds the sealant in place and prevents it from dripping from its desired location on heating.

The method of sealing automobile body joints and similar areas comprising applying the above sealant clip to the joint and subsequently heating the sealant.

2 Claims, 5 Drawing Figures

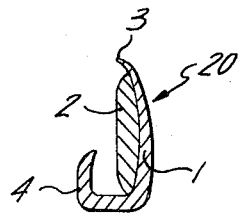
FIG.1
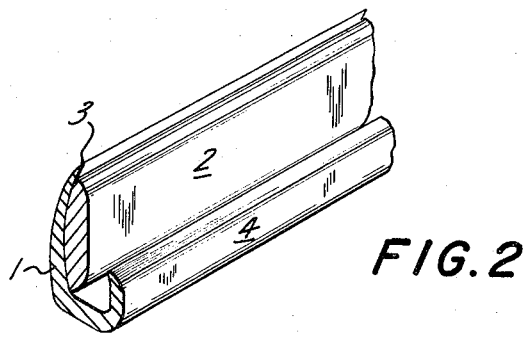
FIG.2
FIG.3
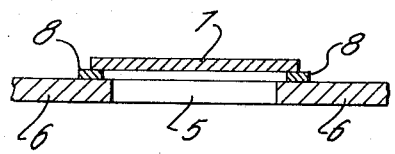
FIG.4
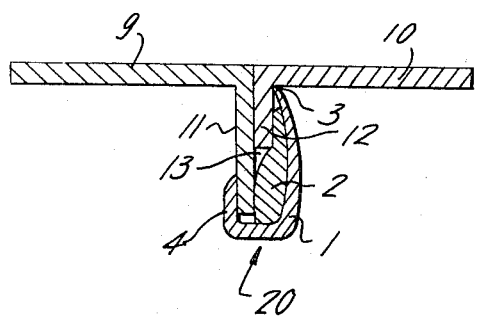
FIG.5
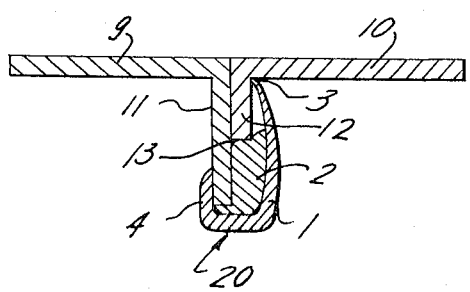

SEALANT

This is a division, of application Ser. No. 217,698, filed Dec. 3, 1971, now abandoned.

BACKGROUND OF THE INVENTION

1. Field of the Invention

This invention pertains to the field of sealant compositions and method of sealing. More particularly, the invention pertains to sealant compositions adapted to seal automobile joints, such as welded joints.

Although this invention is specifically described with respect to sealing of automobile bodies, it will be apparent to those skilled in the art that these sealants and methods are also applicable to other assemblies having similar properties and problems; for example, airplane bodies, boat bodies, appliances and other similar assemblies requiring sealing.

2. Description of the Prior Art

The use of sealants in the automotive industry is old and well known. Sealants are required to be applied on many portions of an automobile body. For example, they are conventionally applied along lines where two metal panels come together and have been fastened together, for example by welding. The use of such sealants is necessitated by the fact that even if such welds are continuous they may contain small gaps or pinholes which would admit carbon monoxide fumes and/or water to the inside of the automobile body. Also, such welds may intentionally not be continuous but rather be only sufficient to make the body structurally sound, subsequently relying on sealant to furnish the needed fume and/or water-tightness.

The sealants used in the automotive industry for sealing auto bodies have conventionally been semi-liquid plastisols or polybutadiene materials which are applied by hand using caulking guns or similar pressure applications to apply the sealant to the desired location. Such application frequently results in an undesirable variation in sealant bead dimensions and in unsealed spots due to the difficulty of reaching into and seeing rather inaccessible locations, such as up underneath various parts. Also, the monotonous nature of assembly line work gives rise to human error which shows up in unsealed joints which the operator just simply missed.

The existing sealants and methods of application have also had other problems. Among these is the problem of waste and dripping. The sealants are generally applied to the automobile prior to its passing through the paint curing ovens. In passing through such ovens the sealant which has been applied to the various joints tends to become more liquid and, with the jiggling of the body conveyors, often drips from the joints onto other body parts or onto the floor of the ovens. Removal of such drippings is monotonous and time-consuming and their removal from the floor of ovens requires time-consuming and costly shut-down of the ovens.

SUMMARY OF THE INVENTION

Applicants have now developed a novel sealant which can be uniformly applied in sheet or in strip form, rather than by caulking gun or similar pressure devices.

The sealant of this invention broadly comprises a non-hardening blend of a block copolymeric rubber of styrene and butadiene, a vinyl toluene copolymer, a filler such as calcium carbonate, and one or more antioxidants designed to preserve the non-hardening nature of the blend.

The sealant blend which comprises this invention can, upon heating, be readily extruded into sheets or strips for application to the desired joint. At normal ambient conditions it is virtually tack free; however, upon heating it flows and adheres to become a highly effective sealant. Although the sealant of this invention softens upon heating and hardens upon cooling, it never becomes truly hard but always retains its rubbery nature. This characteristic of never truly hardening contributes substantially to its properties as a sealant. Also, as a result of this, scrap material can be combined, heated and reextruded.

One manner of application of the subject sealant is to extrude a sheet from it, cool the sheet, and then apply the cooled sheet to the part to be sealed. For example, a sheet of sealant can be placed on the floor pan of an automobile where it is desired to seal joints or openings which have been formed during assembly of the auto body. The operation of sealing can be done by the simple placement of the sheet and subsequent passage of the body through the paint curing ovens, where the sealant becomes soft and adheres to the floor pan. Upon subsequent cooling, the cooled sealant remains adhered to the floor pan but remains rubbery and does not harden for the life of the automobile.

The labor savings in use of this sheet technique versus hand application of a bead of sealant from a pressure gun will be most apparent to those skilled in the art.

Larger openings can be sealed by placing a sheet or gasket of the sealant over or around the edge of the opening and then covering it with a sheet of wood, plastic or metal. Upon heating the sealant adheres to both surfaces and upon cooling forms a rubber seal between the surfaces and holds them together.

Another manner in which the sealant of this invention can be applied is by attaching a sealant clip to the joint to be sealed and then heating the sealant. Such a sealant clip can be formed by extruding sealant onto a clip-on holder such as that shown in cross-section in FIG. 1. The clip can be applied to a joint to be sealed by simply snapping it over the joint in the manner shown in FIG. 4. It will be readily seen that in hard-to-see locations such application can be done by feel.

After application of the sealant clip the auto body can be passed through paint curing ovens where the clip, which is of material which retains its shape and resiliency at the temperature of the ovens, holds the sealant strip against the joint to be sealed. The sealant strip softens under the influence of the heat and flows to seal the joint. However, it is prevented from dripping off the joint by the configuration of the sealant clip. After cooling the clip can either be stripped from the sealant or left in place indefinitely.

BRIEF DESCRIPTION OF THE DRAWINGS

FIG. 1 is a cross-section view of a sealant clip according to this invention.

FIG. 2 is a perspective view of the same clip.

FIG. 3 shows in schematic form the closing of a larger opening by the use of a gasket made from the sealant of this invention.

FIGS. 4 and 5 show the sealant clip in position on a joint before and after heating.

DESCRIPTION OF THE PREFERRED EMBODIMENT

Referring more particularly to the drawings, especially FIGS. 1 and 2, reference numeral 1 indicates the clip-on holder of this invention. The typical composition and formation of this holder will be described later in this application. Reference numeral 2 indicates a strip of the sealant of this invention, which is adhered to the holder. Such construction can be obtained, for example, by co-extrusion of the clip and the sealant, forming the sealant clip 20.

In the cross-section view of the sealant clip 20 shown in FIGS. 1 and 2, the holder 1 comprises a thin flexible edge portion 3 adapted to hold the sealant strip 2 against the joint to be sealed. Reference numeral 4 indicates a U-shaped channel portion of the holder, which is adapted to be snapped over a protruding portion of the joint to be sealed in such a manner as to hold the sealant strip 2 in place and prevent any undesirable flow of the sealant.

FIG. 3 illustrates sealing of a large opening 5 in a plate 6 by placing a gasket 8 of the sealant of this invention over and around the edge of opening 5 and then placing a second plate 7 over the gasket and opening. Upon heating the gasket softens and adheres to both plates 6 and 7, remaining an adherent but resilient seal upon cooling.

FIGS. 4 and 5 of the drawings show the sealant clip of this invention, comprising a holder 1 and a sealant strip 2, clipped in position over the joint 13 between the abutting flanges 11 and 12 of plates 9 and 10. FIG. 4 shows the location of sealant strip 2 before heating and FIG. 5 shows its position after heating, when the sealant has flowed to seal joint 13.

The clip can typically be formed of vinyl material. A typical composition is set forth below.

| | | |
|---|---|---|
| Geon 102EPF5 | 56.3% by weight | PVC |
| DIDP | 22.5% | Plasticizer |
| Paraplex G-62 | 2.8% | Epoxidized Soya Oil |
| Ferro 1827 | 2.4% | Ba, Cd, Zn Stabilizer |
| Ferro 904 | 0.4% | Chelator |
| Tipure R960 | 8.4% | TiO$_2$ |
| Regal 660R | 0.2% | Furnace Black |
| Mistron Vapor Talc | 7.0% | Magnesium Silicate |
| | 100.0% | |

Although a particular preferred composition for the clip-on holder has been set forth above, it will be obvious to those skilled in the art that other types of holders can also be employed in addition to the one disclosed. The only requirements for the holder are that it be flexible, resilient, capable of attachment to the sealant strip, preferably without use of a separate adhesive (for example by co-extrusion), substantially non-reactive with the sealant, and that it retain these properties and not melt within the temperature range to which it will be exposed. Other suitable clip materials are, for example, ABS, chlorinated polyethylene, polyolefins, and metals, such as aluminum. Vinyl materials are particularly suitable due to their cost and the great variety of properties available.

A preferred sealant composition is set forth in the Abstract of the Disclosure.

Although particular blocked styrene-butadiene rubber materials are disclosed herein as being preferred for use in the sealant strip, other SBR materials may also be used as long as they are thermoplastic, remain thermoplastic on storage (before use), adhere to a variety of substrates, and remain rubbery after fusion and for the life of the article. SBR materials in general and their properties are described in U.S. Pat. No. 3,390,207.

Although particular preferred vinyl toluene copolymer resins have been described in this application, other vinyl toluene copolymers may be used as long as they are compatible with SBR, contribute softening in the temperature range needed, and do not seriously detract from physical properties of the blend. Generally, such copolymers will have a melting point between about 75° and 125° C. Copolymers of vinyl toluene with alpha methyl styrene have been found to be particularly suitable. Examples of such copolymers are Piccotex 75 and Piccotex 100, products of the Pennsylvania Industrial Chemical Corporation, Clairton, Pennsylvania. The vinyl toluene copolymer functions as a tackifier.

It will be obvious to those skilled in the art that the sealant composition can be varied without departing from the scope of the invention. For example, fillers other than calcium carbonate, such as barytes, talc, clays, mica, silica, and other well-known fillers can be employed. The function of the filler is to help control flow during fusion, and promote some rigidity.

It will also be obvious that numerous colorants other than carbon black will be suitable. Typical examples are titanium dioxide, powdered aluminum, iron oxide and lead chromate. Also, it may be desirable in certain instances to completely omit colorant and use the material color inherent in the sealant blend.

It will be apparent to those skilled in the art that the composition of the sealants of this invention can be varied so as to obtain different softening points. Such variation may be desirable, for example, where one auto manufacturer uses paint curing ovens set at a given temperature and another auto manufacturer, employing a different type of paint, uses other temperatures. It is, of course, desirable to obtain a sealant blend which will soften sufficiently to flow and adhere at the desired paint curing temperature but will not become completely liquid and run.

Three examples of sealant compositions within the scope of this invention, having different softening points, are set forth in the table below, along with the physical properties of the composition. All parts are by weight.

| | Examples | | |
|---|---|---|---|
| | 1 | 2 | 3 |
| Kraton 4113 | 42.1 | 42.1 | 39.3 |
| Piccotex 100 | 13.5 | — | — |
| Piccotex 75 | — | 13.5 | 19.2 |
| Camelwite Whiting | 42.1 | 42.1 | 39.3 |
| Regal 660R | 1.7 | 1.7 | 1.6 |
| Plastanox 2246 | 0.4 | 0.4 | 0.4 |
| Plastanox LTDP | 0.2 | 0.2 | 0.2 |
| | 100.0 | 100.0 | 100.0 |

| Softening Point | | | |
|---|---|---|---|
| Mod. ASTM D816 | 285°F. | 273°F. | 250°F. |

Method B, Adhesion Strength in Shear: Type 1 - Lab specimen was used. One square inch of sealant 100 mils thick was used and the surfaces bonded were prime panel to prime panel. Laminations were made at 30 min. at 250°F. with no added pressure used. The test procedure was modified by not pulling on a tension testing machine, but by hanging a load of 50 gm. on the assembly in an oven set at 150°F., then increasing temperature 10°F. per 1 min. until the specimen failed to hold. The temperature at which failure occurred was recorded.

| Tensile Strength | | | |
| --- | --- | --- | --- |
| ASTM D412 | 425 lbs/in.$^2$ | 385 | 280 lbs/in.$^2$ |
| Elongation | | | |
| ASTM D412 | 900%+ | 900%+ | 900%+ |
| Tear Strength | | | |
| ASTM D1004 | 102 lbs/in. | 95 | 82 lbs/in. |
| Cleavage Adhesion | | | |
| Mod. ASTM D1062 (one in.$^2$) | 80 lbs/in. | 65 | 55 lbs/in. |

Galvanized steel and primed phosphatized steel are used in the assembly. The metal should be 20 gauge or heavier. The assembly is baked at 250°F. for 30 minutes with no added pressure. Allow the assembly to recover to room temperature and then pull on a tension testing machine at a crosshead speed of 2 inches/min.

| Shear Adhesion | | | |
| --- | --- | --- | --- |
| Mod. ASTM D816 (one in.$^2$) | 150 lbs/in.$^2$ | 100 | 85 |

Method B, Type 1 Specimen. Assemblies made one inch square in area with sealant 100 mils thick. Surfaces bonded were prime panel to galvanized metal. Laminations were made at 250°F. with no added pressure. Specimens were pulled in a tension testing machine per ASTM D816.

| Hardness Shore A Durometer | | | |
| --- | --- | --- | --- |
| ASTM D2240 | 70 | 52 | 50 |

Typical ranges of the components in the sealants of this invention are set forth below.

From about 15% to about 50% by weight blocked SBR, preferably from about 25% to about 45%.

From about 5% to about 40% by weight, preferably from about 10% to about 30% vinyl toluene copolymer.

From about 0% to about 75% by weight, preferably from about 30% to about 50% filler.

In addition to the above, an effective amount of colorant, for example from about 1% to about 15%, and effective amounts of additives such as stabilizers and antioxidants, typically from about 0.5 to about 2%, may be employed.

Application of both sheets and clips of the sealant composition set forth in the abstract to joints desired to be sealed, followed by heating at temperatures in the range from about 210°F. to about 350°F., has resulted in watertight sealing of the joints with a seal which has proved non-hardening upon aging.

As an example of the method of fabrication of the sealant clip, the vinyl clip composition set out above and the sealant composition of Example 1 were coextruded. The vinly clip composition was first dry-blended in a high speed mixer. The sealant composition was mixed on a conventional two roll mill. Both materials were then fed into vented, two-stage extruders and the vinyl was extruded at 350° - 380°F. barrel temperature. A common extrusion die was fed by the two extruders. The sealant was extruded at 280° - 300°F. barrel temperature.

APPENDIX

The 4000 series of Kraton materials are styrene-butadiene block copolymers made by Shell Chemical Company. These materials are fully described in technical bulletin SCR: 69-202 (May, 1969) and summary data sheet SC: 70-20 (June, 1970), both of Shell Chemical Company, Polymers Division.

Piccotex 75, 100 and 120 are copolymers of vinyl toluene and alpha methyl styrene made by Pennsylvania Industrial Chemical Corporation of Clairton, Pa. These resins are more particularly described in a bulletin of that company numbered PPN-034-A.

Plastanox LTDP Antioxidant is a product of American Cyanamid Company and is more particularly described in their Sales Specification 6-2574-600-10/66 as being 3,3'-dilaurylthiodipropionate.

Plastanox 2246 is also a product of American Cyanamid Company and is a hindered phenol which is more particularly described in their Technical Data Sheet 6-2583-600-12/66 as being 2,2'-methylenebis(4-methyl-6-tert-butylphenyl).

Geon 102 EP-F5 is a polyvinyl chloride resin product of B. F. Goodrich Chemical Company.

DIDP is diisodecylphthalate.

R and H Paraplex G-62 is epoxidized soya oil which is a product of Rohm and Haas Company.

Ferro 1827 stabilizer comprises barium, cadmium and zinc and is a product of Ferro Corporation. Ferro 904 is an organic phosphite chelator and is also a product of Ferro Corporation.

Tipure R960 is a titanium dioxide pigment which is a product of E. I. DuPont DeNemours and Company.

Regal 660R is furnace black which is a product of Cabot Corporation.

Mistron Vapor Talc is a magnesium silicate product of United Sierra Division of Cyprus Mines Corporation.

The texts of the technical data sheets and bulletin referred to above are incorporated herein by reference.

We claim:

1. A sealant clip comprising
   a. L-shaped flexible, resilient holder means wherein the long and short parallel arms of the L are thin, resilient and inwardly biased so as to render the holder means capable of being clipped on and, by its own resilience, remaining clipped to a flanged joint between two surfaces,
   b. sealant strip means attached to the interior of the holder means in such a manner that the holder means resiliently holds the strip means against the joint,
   c. the holder means having a softening point above that of the sealant strip means.

wherein the sealant strip means comprises a non-hardening blend of;
15–50% blocked SBR
5–40% vinyltoluene copolymer having a melting point between 75° and 125°C.
0–75% filler.

2. The sealant clip of claim 1 wherein the holder means comprises polyvinyl chloride, the vinyl toluene copolymer is a copolymer of vinyl toluene and alpha methyl styrene, and the sealant strip additionally comprises an amount of antioxidant effective to prevent the sealant from hardening due to oxidation.

* * * * *